US012741897B2

(12) United States Patent
Yi et al.

(10) Patent No.: US 12,741,897 B2
(45) Date of Patent: Sep. 22, 2026

(54) UNIT CELL THIN FILM GLASS MANUFACTURED BY MEANS OF GLASS CUTTING AND POST-PROCESSING METHOD

(71) Applicant: DOWOOINSYS CO., LTD., Cheongju-si (KR)

(72) Inventors: Seung Jun Yi, Suwon-si (KR); Hyung Sup Lee, Yongin-si (KR); Soung Woong Choi, Cheongju-si (KR)

(73) Assignee: DOWOOINSYS CO., LTD., Cheongju-si (KR)

( * ) Notice: Subject to any disclaimer, the term of this patent is extended or adjusted under 35 U.S.C. 154(b) by 186 days.

(21) Appl. No.: 18/833,674

(22) PCT Filed: Jun. 29, 2022

(86) PCT No.: PCT/KR2022/009291

§ 371 (c)(1),
(2) Date: Jul. 26, 2024

(87) PCT Pub. No.: WO2023/234467

PCT Pub. Date: Dec. 7, 2023

(65) Prior Publication Data

US 2025/0154046 A1 May 15, 2025

(30) Foreign Application Priority Data

May 30, 2022 (KR) ........................ 10-2022-0066004

(51) Int. Cl.

| | |
|---|---|
| ***C03B 33/07*** | (2006.01) |
| ***C03B 33/10*** | (2006.01) |
| ***C03C 17/00*** | (2006.01) |

(52) U.S. Cl.
CPC .......... *C03B 33/074* (2013.01); *C03B 33/102* (2013.01); *C03C 17/002* (2013.01); *C03C 2218/328* (2013.01); *C03C 2218/34* (2013.01)

(58) Field of Classification Search
CPC ... C03B 33/074; C03B 33/102; C03B 17/002; C03B 2218/328; C03B 2218/34; G02F 1/1333; G02F 1/133302; G02F 1/133368

(Continued)

(56) References Cited

U.S. PATENT DOCUMENTS

2021/0341663 A1* 11/2021 Fukuoka ................ G02B 6/003

FOREIGN PATENT DOCUMENTS

| | | |
|---|---|---|
| JP | 2017193482 A | 10/2017 |
| KR | 101684344 B1 | 12/2016 |

(Continued)

OTHER PUBLICATIONS

International search report of PCT/KR2022/009291, Feb. 27, 2023, English translation.

*Primary Examiner* — David Y Chung
(74) *Attorney, Agent, or Firm* — STIP Law Group, LLC

(57) ABSTRACT

Thin glass in cell unit (4) manufactured by glass cutting and post-processing methods according to the present invention is the thin glass in cell unit (4) installed on the front surface of an electronic device or a display unit of an electronic device, wherein a bevel-shaped cut portion (41) is formed at an end of one side of the thin glass in cell unit (4) in contact with the front surface of the display unit. In addition, the bevel-shaped cut portion (41) has a height (H) of 5% or more and 50% or less of a thickness of the thin glass in cell unit (4). In addition, the bevel-shaped cut portion (41) has a width (W) of 10% or more and 300% or less of the thickness of the thin glass in cell unit (4), and the thin glass in cell unit (4) is bent toward the front of the display unit.

3 Claims, 8 Drawing Sheets

(58) Field of Classification Search
USPC .................................................. 349/158, 160
See application file for complete search history.

(56) References Cited

FOREIGN PATENT DOCUMENTS

| | | | |
|---|---|---|---|
| KR | 102222715 | B1 | 3/2021 |
| KR | 102240445 | B1 | 4/2021 |
| KR | 20220012488 | A | 2/2022 |

* cited by examiner

[FIG. 1]
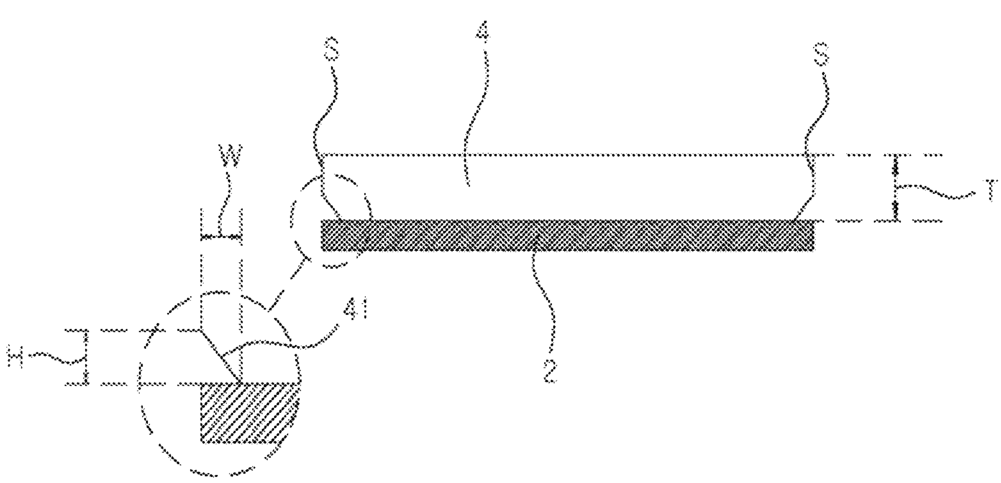

[FIG. 2]
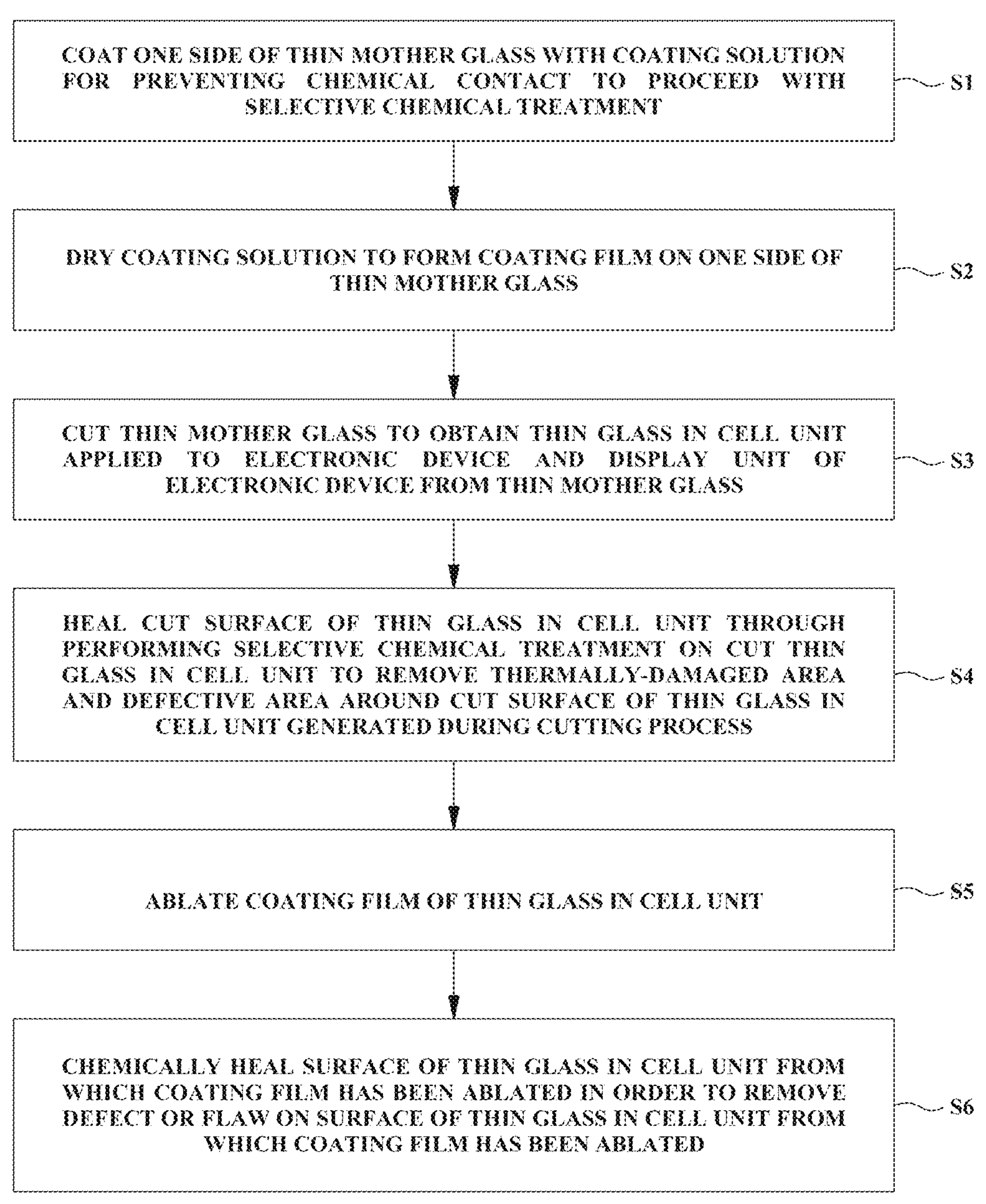

[FIG. 3]
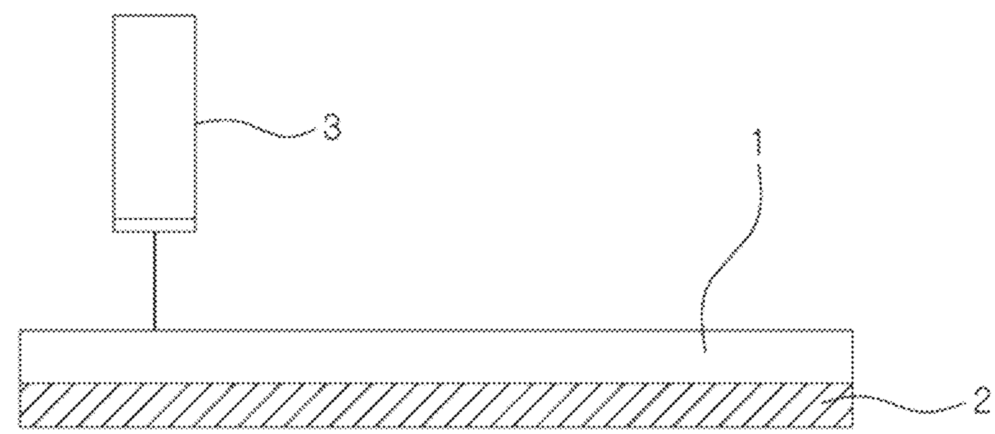

[FIG. 5A]
EXAMPLE 1
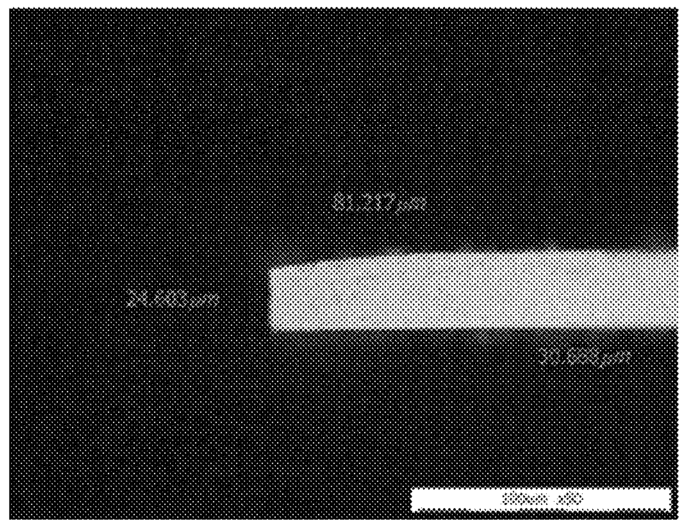
T: 30.6um
SH: 24.6um
W: 81.2um
H: 6um

[FIG. 5B]
EXAMPLE 2
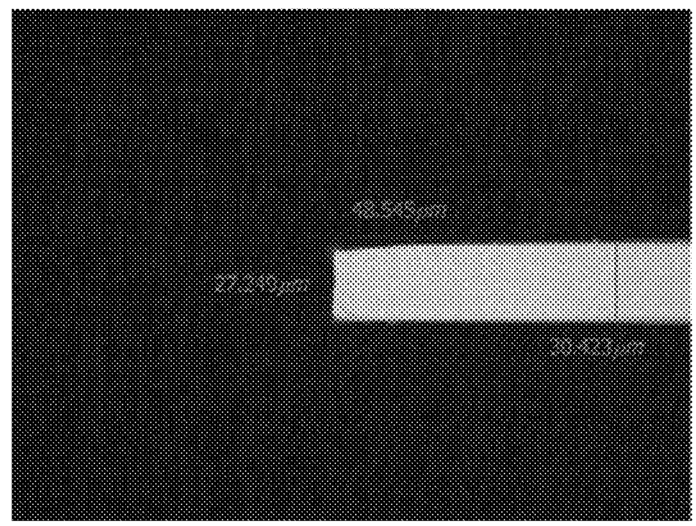
T: 30.4um
SH: 27.2um
W: 48.5um
H: 3.2um

[FIG. 5C]
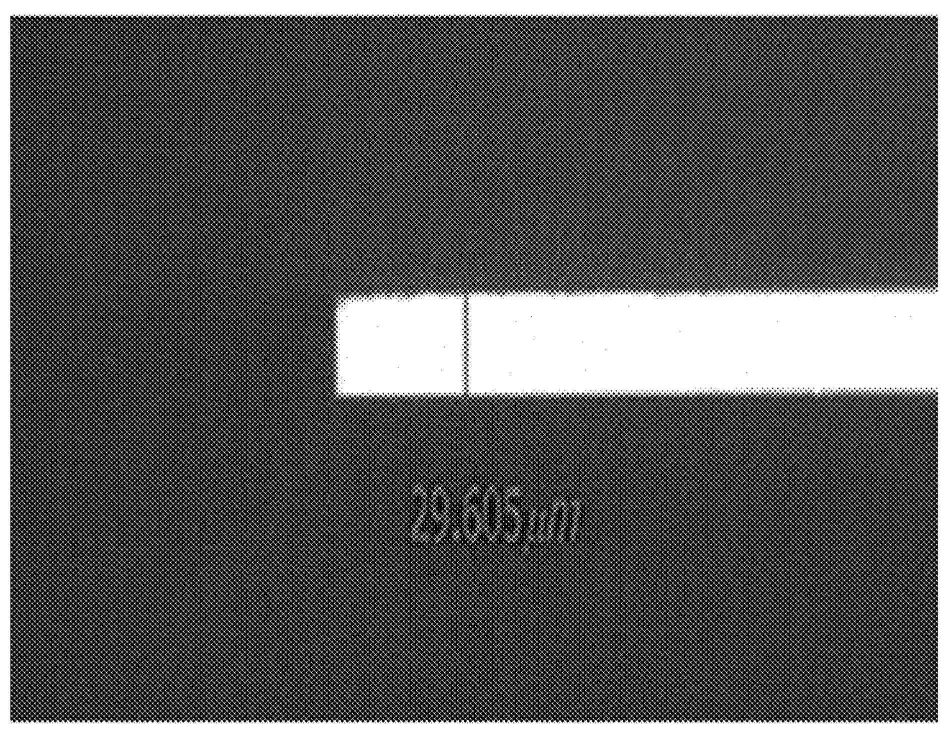
T: 29.6um

[FIG. 5D]
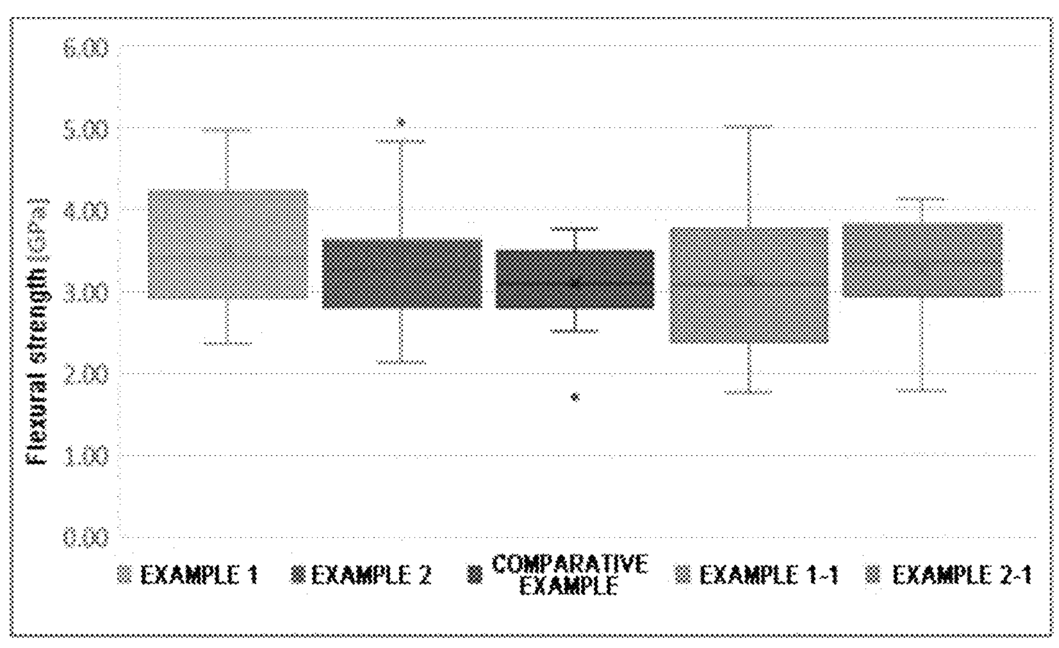
| CONDITIONS | Min. [Gpa] | Max. [Gpa] | Avg. [Gpa] | STD. [Gpa] |
|---|---|---|---|---|
| EXAMPLE 1 | 2.36 | 4.97 | 3.51 | 0.73 |
| EXAMPLE 2 | 2.13 | 5.06 | 3.39 | 0.79 |
| COMPARATIVE EXAMPLE | 1.70 | 3.75 | 3.08 | 0.46 |
| EXAMPLE 1-1 | 1.76 | 5.01 | 3.11 | 0.91 |
| EXAMPLE 2-1 | 1.78 | 4.12 | 3.26 | 0.62 |
Min: MINIMUM VALUE Max: MAXIMUM VALUE
Avg: AVERAGE VALUE STD: AVERAGE DEVIATION
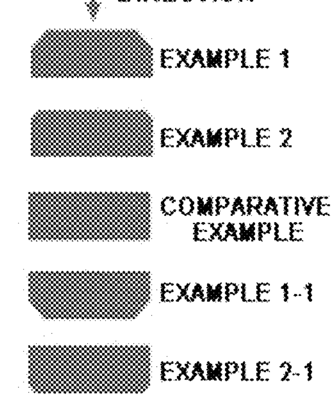

UNIT CELL THIN FILM GLASS MANUFACTURED BY MEANS OF GLASS CUTTING AND POST-PROCESSING METHOD

CROSS-REFERENCE TO RELATED APPLICATIONS

This application is the U.S. National Phase under 35 U.S.C. § 371 of International Application No. PCT/KR2022/009291, filed on Jun. 29, 2022, which in turn claims the benefit of Korean Application No. 10-2022-0066004, filed on May 30, 2022, the disclosures of which are incorporated by reference into the present application.

TECHNICAL FIELD

The present invention relates to thin glass in cell unit manufactured by glass cutting and post-processing methods, and more particularly, to thin glass in cell unit having a bevel-shaped cut portion formed at an end of one side of the thin glass in cell unit in contact with an electric device or a display unit of an electric device, thereby improving bending properties and durability of the thin glass in cell unit.

BACKGROUND ART

Recently, due to the slimming of electronic products such as smart phones, common glass or an acrylic plate typically used is being replaced by thin glass.

The thin glass is used as a display window for portable electronic products such as mobile phones, PMPs, and MP3 players, and the thinner the thin glass, the better it is in terms of design and portability.

In order to manufacture thin glass in cell unit applied to various electronic products, thin mother glass is cut to a certain size.

At this time, fine cracks or fine chippings generated during the cutting cause degradation in strength of the cut thin glasses in cell units, and in order to minimize the degradation, face-milling and chamfering processes are additionally performed.

However, in such processes, there is a risk of damage during the face-milling and chamfering processes since the thin mother glass is very thin, and there is a problem in that individually face-milling and chamfering the thin glasses in cell units applied to a product result in a significant loss in labor and time.

In order to solve the above-described problem, a method for bonding and laminating thin mother glasses and then processing the laminated thin mother glasses into a single body has been proposed.

The method for bonding and laminating thin mother glasses and then processing the laminated thin mother glasses into a single body includes a first embodiment of performing processing by using a CNC, and a second embodiment of performing processing by using a laser beam, and a detailed description of the first embodiment is as follows.

First, the first embodiment broadly includes the steps of laminating two or more sheets of thin mother glass and applying a resin for maintaining a height gap between the two or more sheets of thin mother glass according to a preset pattern, cutting the laminated two or more sheets of thin mother glass by using a CNC processing method, thereby obtaining thin glasses in cell units applied to various electrical and electronic products, from the thin mother glasses, chemically healing laminated several sheets of thin glass in cell unit to smooth cut surfaces of the thin glasses in cell units, cleaning the healed thin glasses in cell units, completely curing the resin applied between the thin glass in cell unit and the thin glass in cell unit to make it easy to peel off the resin, peeling off the resin adhered between the thin glass in cell unit and the thin glass in cell unit, cleaning the thin glasses in cell units from which the resin has been removed, chemically healing the cleaned thin glasses in cell units, and cleaning the chemically-healed thin glasses in cell units, reinforcing the cleaned thin glasses in cell unit, and then subjecting the same to a subsequent process.

The laminating of two or more sheets of thin mother glass and applying a resin for maintaining a height gap between the two or more sheets of thin mother glass according to a preset pattern includes a 1-1 step of applying a resin on an upper surface of thin mother glass, a 1-2 step of laminating thin mother glass on the applied resin and then thinly spreading the resin, a 1-3 step of UV-curing the thinly-spread resin, and repeating the 1-1 step to the 1-3 step to laminate two or more sheets of the thin mother glass.

However, due to the process of laminating two or more sheets of thin mother glass by using a resin, the CNC cutting process including roughing, semi-finishing, and finishing processes to cut the laminated thin mother glasses into thin glasses in cell units, the process of chemically healing laminated thin glasses in cell units to smooth cut surfaces of the thin glasses in cell units, the process of completely curing the resin to make it easy to separate the laminated thin glasses in cell units, the process of cleaning the thin glasses in cell units after peeling off the resin, and the process of chemically healing and then cleaning the thin glasses in cell units, the first embodiment has problems of not only requiring a significant amount of time to manufacture thin glasses in cell units, but also increasing manufacturing costs of the thin glasses in cell units.

Next, a detailed description of the second embodiment is as follows.

The second embodiment of performing processing by using a laser beam broadly includes the steps of a first step of irradiating a laser beam along a cutting line of thin mother glass to cut the thin mother glass, thereby obtaining thin glasses in cell units from the thin mother glass, a second step of laminating two or more sheets of the cut thin glass in cell unit and applying a resin for a height gap between the thin glasses in cell units vertically disposed, a third step of chemically healing the laminated two or more sheets of thin glass in cell unit to smooth cut surfaces of the cut thin glasses in cell units, a fourth step of cleaning the laminated thin glasses in cell units, a fifth step of completely curing the resin applied between the laminated several sheets of thin glass in cell unit and the thin glass in cell unit to make it easy to peel off the resin, a sixth step of peeling off the resin adhered to the thin glass in cell unit and then cleaning the individually separated thin glass in cell unit, a seventh step of chemically healing the cleaned thin glass in cell unit, and an eighth step of cleaning and then reinforcing the chemically-healed thin glass in cell unit, and then subjecting the same to a subsequent process.

In addition, the second step of laminating two or more sheets of the cut thin glass in cell unit and applying a resin for a height gap between the thin glasses in cell units vertically disposed includes a 2-1 step of laminating two or more sheets of the cut thin glass in cell unit and applying a resin for a height gap between a pair of thin glasses in cell units vertically disposed, a 2-2 step of laminating thin glass in cell unit on the applied resin and then thinly spreading the resin, a 2-3 step of UV-curing the evenly-spread resin, and repeating the 2-1 step to the 2-3 step to laminate two or more sheets of cut thin glass in cell unit.

However, due to the process of laminating two or more sheets of cut thin glass in cell unit by using a resin, the process of completely curing the resin applied between the laminated thin glasses in cell units, and the process of peeling off the resin and separating the laminated thin glasses in cell units, the method of using a laser beam has problems of not only requiring a significant amount of time to manufacture thin glasses in cell units, but also increasing manufacturing costs of the thin glasses in cell units.

In addition, in the case of a method for cutting glass by using a CNC, a defect such as fine cracks or fine chippings is generated on a cut surface, so that there is a problem in that thin glass in cell unit is easily broken.

The defect of fine cracks or fine chippings caused by a CNC may cause degradation in flexural strength even after reinforcing the thin glass in cell unit.

As a method mainly used to compensate for a weakened portion of a CNC or laser cut surface, as in the first embodiment and in the second embodiment, there is a method for laminating thin glass in cell unit in several layers by using a resin, and then performing chemical treatment on a cut surface to heal a defect or a thermally-damaged area generated when cutting glass.

However, the method for treating a cut surface also has limitations, so that it is necessary to secure a method capable of minimizing damage to thin glass when cutting the thin glass by using a CNC process or a laser process, and if such a method is secured, there is a problem in that a process margin becomes small and processing time of thin glass in cell unit applied to various electrical and electronic products is long, and if a surface-treatment process is additionally performed, a process of manufacturing the thin glass in cell unit becomes very complicated, which may cause an increase in costs when manufacturing a product.

Meanwhile, as the prior art of the present invention, "Efficient processing method of thin-plate glass" under application number "10-2010-0026394" has been applied for and disclosed, wherein the efficient processing method of thin-plate glass includes a process of applying a bonding material between laminated glass mother-plates to bond the glass mother-plates to each other, and collectively cutting the bonded glass mother-plate into block units, a process of face-milling a thin-plate material in block units, and a process of polishing a cut cross-section by using a rotational force of a brush and an abrasive.

However, the efficient processing method of thin-plate glass has a problem in that a defect of fine cracks or fine chippings on the cut cross-section of the thin-plate glass is not completely removed due to the face-milling process and the polishing process.

DISCLOSURE OF THE INVENTION

Technical Problem

The present disclosure provides thin glass in cell unit manufactured by glass cutting and post-processing methods capable of reducing manufacturing costs during a glass cutting process and a post-processing process performed in the manufacture of ultra-thin glass (UTG) in cell unit, which is applied to various electrical and electronic products.

The present disclosure also provides thin glass in cell unit manufactured by glass cutting and post-processing methods capable of lowering manufacturing costs of thin glass in cell unit by simplifying a manufacturing process in the manufacture of the thin glass in cell unit.

The present disclosure also provides thin glass in cell unit manufactured by glass cutting and post-processing methods capable of improving the durability of processed thin glass in cell unit by removing, through selective chemical treatment, a defect or a thermally-damaged area around a glass cut surface, the defect generated during the glass cutting.

The present disclosure also provides thin glass in cell unit manufactured by glass cutting and post-processing methods, and thus, having excellent bending properties and durability.

Technical Solution

Thin glass in cell unit 4 manufactured by glass cutting and post-processing methods according to the present invention for achieving the above objectives is the thin glass in cell unit 4 installed on the front surface of an electronic device or a display unit of an electronic device, wherein a bevel-shaped cut portion 41 is formed at an end of one side of the thin glass in cell unit 4 in contact with the front surface of the display unit. The bevel-shaped cut portion 41 has a height H of 5% or more and 50% or less of a thickness T of the thin glass in cell unit 4. The bevel-shaped cut portion 41 has a width W of 10% or more and 300% or less of the thickness T of the thin glass in cell unit 4. The thin glass in cell unit 4 is bent toward the front of the display unit. The tilt angle of a side portion S of the thin glass in cell unit 4 is 85 degrees to 95 degrees with respect to a horizontal surface. The glass cutting and post-processing methods include S1 coating one side of thin mother glass 1 with a coating solution for preventing chemical contact in order to proceed with selective chemical treatment, S2 drying the coating solution to form a coating film 2 on one side of the thin mother glass 1, S3 cutting the thin mother glass 1 to obtain thin glass in cell unit 4, which is applied to an electronic device or a display unit of an electronic device, from the thin mother glass 1, S4 healing a cut surface of the thin glass in cell unit 4 through performing selective chemical treatment on the cut thin glass in cell unit 4 in order to remove a thermally-damaged area and a defective area generated around the cut surface of the thin glass in cell unit 4 during the cutting process, S5 ablating the coating film 2 of the thin glass in cell unit 4, and S6 chemically healing a surface of the thin glass in cell unit 4, from which the coating film 2 has been ablated, in order to remove a defect or a flaw on the surface of the thin glass in cell unit 4 from which the coating film 2 has been ablated. In S3 of the cutting of the thin mother glass 1 to obtain the thin glass in cell unit 4, which is applied to an electronic device or a display unit of an electronic device, from the thin mother glass 1, if the coating film 2 is formed only on one side of the thin mother glass 1, a surface of the thin mother glass 1 on which the coating film 2 is not formed is irradiated with a laser beam output from an infrared laser 3 generating a wavelength of 1000 nm or greater to cut the thin mother glass 1 and the coating film 2, wherein a nanosecond infrared laser 3, a picosecond infrared laser 3, or a femtosecond infrared laser 3 is used as the infrared laser 3, and the infrared laser 3 outputs a Bessel beam. In S3 of the cutting of the thin mother glass 1 to obtain the thin glass in cell unit 4, which is applied to an electronic device or a display unit of an electronic device, from the thin mother glass 1, a diamond wheel or diamond saw is used as a means of cutting the thin mother glass 1.

Advantageous Effects

The thin glass in cell unit 4 manufactured by glass cutting and post-processing methods according to the present invention may reduce manufacturing time and costs of the thin glass in cell unit 4 by simplifying a manufacturing process in the manufacture of the thin glass in cell unit 4 mounted on various electrical and electronic products.

In addition, the present invention improves durability of processed thin glass in cell unit 4 by removing, through selective chemical treatment, a defect or a thermally-damaged area around a glass cut surface caused by a laser beam when cutting glass by using a laser, and increases manufacturing efficiency through reducing defects.

In addition, the present invention has excellent bending properties and durability, and thus, is suitable for foldable devices which are required to be folded and unfolded frequently.

BRIEF DESCRIPTION OF THE DRAWINGS

FIG. 1 is a diagram in which a bevel-shaped cut portion is formed at an end of one side of thin glass in cell unit through selective chemical treatment;

FIG. 2 is a flowchart of glass cutting and post-processing methods;

FIG. 3 is a diagram illustrating a process in which, if a coating film is formed only on one side of thin mother glass, a surface of the thin mother glass on which the coating film is not formed is irradiated with an infrared laser to cut the thin mother glass and the coating film;

Figure 4:
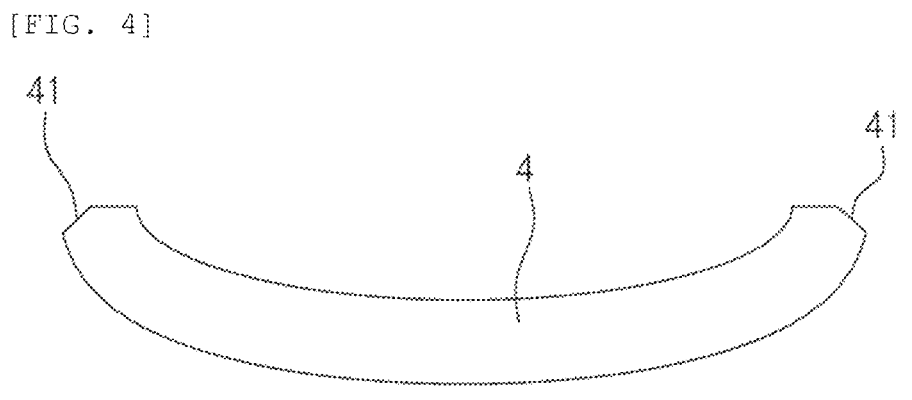

FIG. 4 is a diagram illustrating thin glass in cell unit bent toward the front of a display unit;

FIG. 5A is Example 1 of thin glass in cell unit manufactured by the present invention;

FIG. 5B is Example 2 of thin glass in cell unit manufactured by the present invention;

FIG. 5C is Comparative Example presented for the comparison of flexural strength with the present invention, and shows thin glass in cell unit without a bevel-shaped cut portion; and FIG. 5D is a diagram showing a graph of the flexural strength of each Example and Comparative Example when the thin glass in cell unit 4 illustrated in each of Example 1, Example 1-1, Example 2, Example 2-1, and Comparative Example is folded such that the center of an upper surface of the thin glass in cell unit 4 is concave, and a schematic table of the minimum value, maximum value, average value, and standard deviation of the flexural strength for each Example and Comparative Example.

DESCRIPTION OF THE REFERENCE NUMERALS OR SYMBOLS

1. Thin mother glass 2. Coating film
3. Infrared laser 4. Thin glass in cell unit
41. Beveled-shape cut portion

MODE FOR CARRYING OUT THE INVENTION

Hereinafter, the present invention will be described in detail with reference to the accompanying drawings.

Thin glass in cell unit 4 manufactured by glass cutting and post-processing methods according to the present invention is, as illustrated in FIG. 1, the thin glass in cell unit 4 installed on the front surface of an electronic device or a display unit of an electronic device, wherein a bevel-shaped cut portion 41 is formed at an end of one side of the thin glass in cell unit 4 in contact with the front surface of the display unit.

The bevel-shaped cut portion 41 has a height H of 5% or more and 50% or less of a thickness T of the thin glass in cell unit 4.

The bevel-shaped cut portion 41 has a width W of 10% or more and 300% or less of the thickness T of the thin glass in cell unit 4.

The thin glass in cell unit 4 is bent toward the front of the display unit.

The tilt angle of a side portion S of the thin glass in cell unit 4 is 85 degrees to 95 degrees with respect to a horizontal surface, and preferably, 90 degrees with respect to the horizontal surface.

As illustrated in FIG. 2, the glass cutting and post-processing methods include S1 coating one side of thin mother glass 1 with a coating solution for preventing chemical contact in order to proceed with selective chemical treatment, S2 drying the coating solution to form a coating film 2 on one side of the thin mother glass 1, S3 cutting the thin mother glass 1 to obtain thin glass in cell unit 4, which is applied to an electronic device or a display unit of an electronic device, from the thin mother glass 1, S4 healing a cut surface of the thin glass in cell unit 4 through performing selective chemical treatment on the cut thin glass in cell unit 4 in order to remove a thermally-damaged area and a defective area generated around the cut surface of the thin glass in cell unit 4 during the cutting process, S5 ablating the coating film 2 of the thin glass in cell unit 4, and S6 chemically healing a surface of the thin glass in cell unit 4, from which the coating film 2 has been ablated, in order to remove a defect or a flaw on the surface of the thin glass in cell unit 4 from which the coating film 2 has been ablated.

The thin mother glass 1 and the thin glass in cell unit 4 have a thickness of 100 um or less.

The coating film formed on either side of the thin mother glass 1 has a thickness of 1 um to 30 um.

The thin mother glass 1 is an original-state thin glass 1 before extracting the thin glass in cell unit 4 from the thin mother glass 1, and is also called a mother glass.

The thin glass in cell unit 4 is thin glass cut and separated from the above-described thin mother glass.

A sodium alumino-silicate-based glass is used as the thin mother glass 1.

In S3 of the cutting of the thin mother glass 1 to obtain the thin glass in cell unit 4, which is applied to an electronic device or a display unit of an electronic device, from the thin mother glass 1, if the coating film 2 is formed only on one side of the thin mother glass 1, as illustrated in FIG. 3, a surface of the thin mother glass 1 on which the coating film 2 is not formed is irradiated with a laser beam output from an infrared laser 3 generating a wavelength of 1000 nm or greater to cut the thin mother glass 1 and the coating film 2.

A nanosecond infrared laser 3, a picosecond infrared laser 3, or a femtosecond infrared laser 3 is used as the infrared laser 3, and the infrared laser 3 outputs a Bessel beam.

The infrared laser 3 which outputs a Bessel beam generates heat energy inside the thin mother glass 1 and the coating film 2, such that the thin mother glass 1 and the coating film 2 are cut at the same time.

The infrared laser 3 which outputs a Bessel beam has a laser beam wavelength of 1020 nm to 1040 nm, and has a laser beam size of 1.4 um to 1.8 um, and the pulse duration of a laser beam is 3 ps to 7 ps.

In addition, the pulse repetition rate of the laser beam is 190 khz to 210 khz, and the pulse energy thereof is 38 uJ to 42 uJ.

The coating solution may be an acrylic-based solution, or a polyethylene resin, a polypropylene resin, a polyvinyl chloride resin, or a polystyrene solution.

In S1 of the coating of one side of thin mother glass 1 with a coating solution for preventing chemical contact to proceed with selective chemical treatment, when coating one side of the thin mother glass 1 with the coating solution, a slot die coating method, a spray coating method, an inkjet coating method, a bar coating method, or a screen printing method may be used.

In S2 of the drying of the coating solution to form a coating film 2 on one side of the thin mother glass 1, a method for drying the coating solution may be performed by using an infrared lamp, a hot air generator, a hot plate, an oven, or the like, and a cluster-type or inline-type drier is used.

The thin glass in cell unit 4 is dipped into a healing solution to be healed, wherein the healing solution contains ammonium difluoride, sulfuric acid, nitric acid, water, and an additive.

The additive is a surfactant used to improve healing performance, wherein the surfactant serves to increase the uniformity of healing by lowering surface tension.

The healing solution contains 0.5 wt % to 0.9 wt % of ammonium difluoride, 3 wt % to 15 wt % of sulfuric acid, 1 wt % to 10 wt % of nitric acid, 80 wt % to 90 wt % of water, and 0.01 wt % to 0.1 wt % of an additive.

The surfactant may be a compound represented by Formula 1 below.

$$R_1-OSO_3^-HA^+ \quad \text{[Formula 1]}$$

Here, $R_1$ is 4, 8, 12-triproplypentadecane, and A is triethanolamine.

In S4 of the healing a cut surface of the thin glass in cell unit 4 through performing selective chemical treatment on the cut thin glass in cell unit 4 in order to remove a thermally-damaged area and a defective area generated around the cut surface of the thin glass in cell unit 4 during the cutting process, a bevel-shaped cut portion 41 is formed at an end of one side of the thin glass in cell unit 4 in contact with the coating film 2 by using a healing solution.

As illustrated in FIG. 1, the bevel-shaped cut portion 41 has a height H of 5% or more and 50% or less of a thickness T of the thin glass in cell unit 4.

In addition, as illustrated in FIG. 1, the bevel-shaped cut portion 41 has a width W of 10% or more and 300% or less of the thickness T of the thin glass in cell unit 4.

In S5 of the ablating of the coating film 2 of the thin glass in cell unit 4, the thin glass in cell unit 4 coated with the coating film 2 is immersed and in a solution for ablating the coating film 2 to melt and ablate the coating film 2.

The solution for ablating the coating film 2 is a basic aqueous solution using potassium hydroxide (KOH), wherein the temperature of the potassium hydroxide (KOH) is 25 degrees Celsius or higher.

However, in order to ablate traces of the coating film 2 present on the surface of the thin glass in cell unit 4 due to the attachment of some of the coating film 2, an additional cleaning process may be performed after ablating the coating film 2.

In addition, the present invention further includes reinforcing the surface-healed thin glass in cell unit 4.

In the reinforcing of the surface-healed thin glass in cell unit 4, a reinforcing liquid used to reinforce the thin glass in cell unit 4 uses a potassium nitrate molten liquid.

The cleaning and then reinforcing of the surface-healed thin glass in cell unit 4 includes pre-heating the cleaned thin glass in cell unit 4 in the range of 200° C. to 400° C., reinforcing the pre-heated thin glass in cell unit 4 by immersing the same in a reinforcing liquid maintained at 370° C. to 470° C., and discharging the thin glass in cell unit 4 from the reinforcing liquid and then slowly cooling the thin glass in cell unit 5 to room temperature.

FIG. 5A is Example 1 of thin glass in cell unit 4 manufactured by the present invention, FIG. 5B is Example 2 of thin glass in cell unit 4 manufactured by the present invention, FIG. 5C is Comparative Example presented for the comparison of flexural strength with the present invention, and shows thin glass in cell unit 4 without a bevel-shaped cut portion 41, and FIG. 5D is a diagram showing a graph of the flexural strength of each Example and Comparative Example when the thin glass in cell unit 4 illustrated in each of Example 1, Example 1-1, Example 2, Example 2-1, and Comparative Example is folded such that the center of an upper surface of the thin glass in cell unit 4 is concave, and a schematic table of the minimum value, maximum value, average value, and standard deviation of the flexural strength for each Example and Comparative Example.

As shown in FIG. 5A and FIG. 5B, 'T' is the thickness of the thin glass in cell unit 4, 'SH' is the height of the side portion S of the thin glass in cell unit 4, 'W' is the width of the bevel-shaped cut portion 41, and 'H' is the height of the bevel-shaped cut portion 41.

In FIG. 5D, Example 1-1 is a state diagram showing the thin glass in cell unit illustrated in Example 1 upside down, and in FIG. 5D, Example 2-1 is a state diagram showing the thin glass in cell unit illustrated in Example 2 upside down.

FIG. 5D is a diagram showing a graph of the flexural strength of each Example and Comparative Example when the thin glass in cell unit 4 illustrated in each of Example 1, Example 1-1, Example 2, Example 2-1, and Comparative Example is folded such that the center of an upper surface of the thin glass in cell unit 4 is concave, and a schematic table of the minimum value, maximum value, average value, and standard deviation of the flexural strength for each Example and Comparative Example.

As illustrated in FIG. 5D, it can be seen that the thin glass in cell unit 4 in which the bevel-shaped cut portion 41 was formed (Example 1, Example 1-1, and Example 2-1) has improved flexural strength compared to the thin glass in cell unit 4 (Comparative Example) in which the bevel-shaped cut portion 41 was not formed.

The thin glass in cell unit 4 manufactured by glass cutting and post-processing methods according to the present invention may reduce manufacturing time and costs of the thin glass in cell unit 4 by simplifying a manufacturing process in the manufacture of the thin glass in cell unit 4 mounted on various electrical and electronic products.

In addition, the present invention improves durability of processed thin glass in cell unit 4 by removing, through selective chemical treatment, a defect or a thermally-damaged area around a glass cut surface caused by a laser beam when cutting glass by using a laser, and increases manufacturing efficiency through reducing defects.

In addition, the present invention has excellent bending properties and durability, and thus, is suitable for foldable devices which are required to be folded and unfolded frequently.

The invention claimed is:

1. Thin glass in cell unit (4) installed on the front surface of an electronic device or a display unit of an electronic device, wherein the thin glass in cell unit (4) is manufactured by glass cutting and post-processing methods, wherein:

a bevel-shaped cut portion (41) is formed at an end of one side of the thin glass in cell unit (4) in contact with the front surface of the display unit; and the tilt angle of a side portion(S) of the thin glass in cell unit (4) is 85 degrees to 95 degrees with respect to a horizontal surface, and the glass cutting and post-processing methods include:

(S1) coating one side of thin mother glass (1) with a coating solution for preventing chemical contact in order to proceed with selective chemical treatment;

(S2) drying the coating solution to form a coating film (2) on one side of the thin mother glass (1);

(S3) cutting the thin mother glass (1) to obtain thin glass in cell unit (4), which is applied to an electronic device or a display unit of an electronic device, from the thin mother glass (1);

(S4) healing a cut surface of the thin glass in cell unit (4) through performing selective chemical treatment on the cut thin glass in cell unit (4) in order to remove a thermally-damaged area and a defective area generated around the cut surface of the thin glass in cell unit (4) during the cutting process;

(S5) ablating the coating film (2) of the thin glass in cell unit (4); and (S6) chemically healing a surface of the thin glass in cell unit (4), from which the coating film (2) has been ablated, in order to remove a defect or a flaw on the surface of the thin glass in cell unit (4) from which the coating film (2) has been ablated, wherein in (S3) of the cutting of the thin mother glass (1) to obtain the thin glass in cell unit (4), which is applied to an electronic device or a display unit of an electronic device, from the thin mother glass (1), if the coating film (2) is formed only on one side of the thin mother glass (1), a surface of the thin mother glass (1) on which the coating film (2) is not formed is irradiated with a laser beam output from an infrared laser (3) generating a wavelength of 1000 nm or greater to cut the thin mother glass (1) and the coating film (2), wherein:

a nanosecond infrared laser (3), a picosecond infrared laser (3), or a femtosecond infrared laser (3) is used as the infrared laser (3); and the infrared laser (3) outputs a Bessel beam, and in (S4) of the healing a cut surface of the thin glass in cell unit (4) through performing selective chemical treatment on the cut thin glass in cell unit (4) in order to remove a thermally-damaged area and a defective area generated around the cut surface of the thin glass in cell unit (4) during the cutting process, a bevel-shaped cut portion (41) is formed at an end of one side of the thin glass in cell unit (4) in contact with the coating film (2) by using a healing solution, and the laser beam (3) outputting a Bessel beam has a laser beam wavelength of 1020 nm to 1040 nm, the thin glass in cell unit (4) is bent toward the front of the display unit.

2. The thin glass in cell unit (4) of claim 1 manufactured by glass cutting and post-processing methods, wherein the bevel-shaped cut portion (41) has a height (H) of 5% or more and 50% or less of a thickness (T) of the thin glass in cell unit (4).

3. The thin glass in cell unit (4) of claim 1 manufactured by glass cutting and post-processing methods, wherein the bevel-shaped cut portion (41) has a width (W) of 10% or more and 300% or less of the thickness (T) of the thin glass in cell unit (4).

* * * * *